Patented Feb. 9, 1954

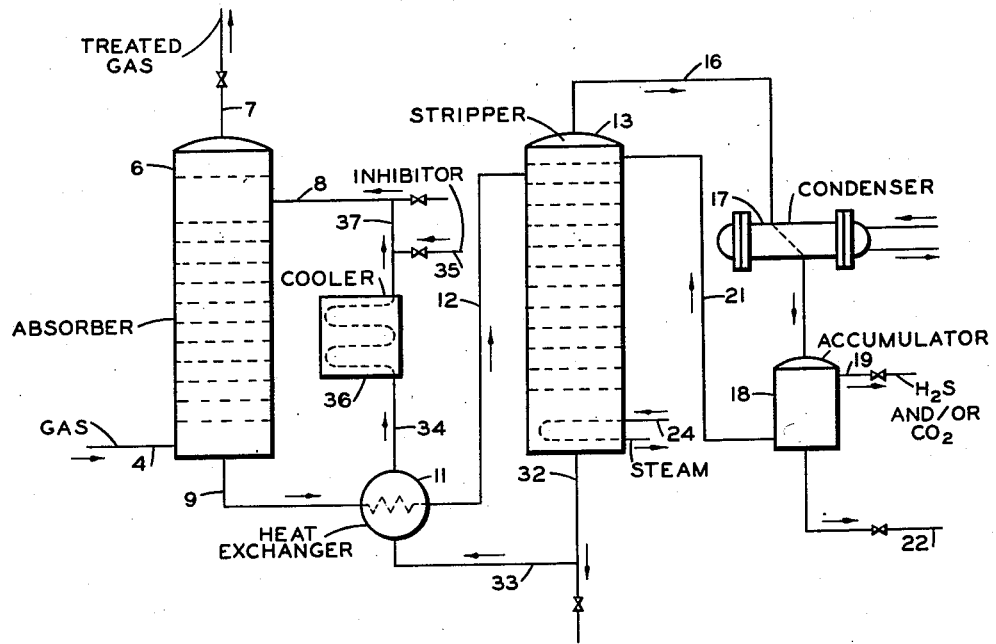

2,668,748

UNITED STATES PATENT OFFICE 2,668,748

REMOVAL OF ACIDIC SUBSTANCES FROM FLUID MIXTURES BY AQUEOUS AMINE SOLUTIONS AND THE PREVENTION OF CORROSION THEREIN

Howard C. Asbury, Cactus, Tex., assignor to Phillips Petroleum Company, a corporation of Delaware Application December 18, 1951, Serial No. 262,316

15 Claims. (Cl. 23—2)

This invention relates to the treatment of fluids containing acidic materials. In one aspect this invention relates to the prevention of corrosion of metallic surfaces by aqueous solutions. In another aspect this invention relates to the removal of acidic material, such as carbon dioxide from gases. In another more specific aspect, this invention relates to the control of the corrosiveness of an aqueous absorption solution used for recovering acidic materials from fluid.

Many gases used commercially for various purposes contain acidic materials which are detrimental to the use of these gases. Particularly ammonia synthesis gas stream and normally gaseous mixtures containing hydrocarbons, for example, natural gas and light gases obtained from various hydrocarbon conversion processes, are used as fuel, as feed to hydrocarbon conversion processes, and in the production of carbon black. Acidic impurities, such as hydrogen sulfide, sulfur dioxide and carbon dioxide, contained in these gases often interfere with chemical reactions in which the gases are involved as well as being injurious to equipment which the gases contact. The detrimental effect of the acidic materials necessitates their removal from the gases. These acidic materials may be removed and recovered from the gases as valuable products, especially hydrogen sulfide which may be used to produce sulfuric acid, and carbon dioxide which may be used in the manufacture of carbon monoxide. From an olfactory aspect it is also desirable in many cases to remove acidic material from gases vented to the atmosphere, such as flue gases and waste refinery gases.

Generally, fluids containing these impurities are treated by contacting the fluid, either in the liquid or vapor phase, with a suitable aqueous absorption medium capable of removing the undesirable impurities. In particular, the absorption medium comprises aqueous solution of a water soluble amine, such as amino alcohols, preferably the ethanol amines, such as monoethanolamine, diethanolamine, triethanolamine and diethanolamine-diethylene glycol, or mixtures of these amines. The fluid containing the acidic impurities is passed into the lower portion of an absorption column to contact a down flowing liquid absorption medium. A treated fluid is removed from the upper portion of the column and is substantially free from the acidic impurities. The absorption medium is passed from the absorption column to a stripping or a reactivation zone for the removal of acidic impurities from the absorption medium. The reactivated absorption medium is then recycled to the absorption column.

Such aqueous absorption mediums often become very corrosive to the metallic surfaces which they contact. For example, a monoethanolamine solution is susceptible to oxidation under certain conditions, and the monoethanolamine may be converted to aminoacetic acid as shown by the following reaction:

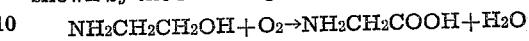

$$NH_2CH_2CH_2OH + O_2 \rightarrow NH_2CH_2COOH + H_2O$$

Aminoacetic acid is corrosive toward metal surfaces especially ferrous metal surfaces when present in the monoethanolamine solution containing carbon dioxide and hydrogen sulfide. Consequently, amine solutions may become corrosive as a result of oxidation occurring when the solutions contact gases containing oxygen as in some cases. Such corrosion of metallic equipment may occur to a highly undesirable extent when a sufficient quantity of aminoacetic acid or other by-products have accumulated in the amine solution.

An aqueous amine solution which has become corrosive after being used for removing carbon dioxide and hydrogen sulfide from gases will dissolve iron from the equipment upon being heated when it is saturated with carbon dioxide. The dissolved iron will be precipitated from the solution when it is boiled or stripped during reactivation, so that the carbon dioxide is released from it, and the solution will dissolve more iron when it again is heated after being resaturated with carbon dioxide. By this cyclic action a rapid corrosion of equipment may occur. It is much to be desired therefore to inhibit the aqueous absorption medium in such a manner as to prevent the corrosion of metallic surfaces thereby.

The removal of acidic materials from fluids in the above described manner is used at some points in production of such materials as toluene, synthetic ammonia, synthetic rubber, sulfuric acid, aviation gasoline, ammonium nitrate, hydrogen, carbon monoxide, fuel gas, and light weight metals.

An object of this invention is to prevent the corrosion of metallic surfaces by aqueous amine solutions in the presence of carbon dioxide.

Another object of this invention is to remove acidic materials from fluids containing the same.

Still another object of this invention is to remove hydrogen sulfide and carbon dioxide from low-boiling hydrocarbon mixtures containing the same.

It is also another object of this invention to provide a corrosion inhibitor for aqueous solutions.

Another object is to prevent the corrosion of metallic surfaces.

It is still a further object of this invention to provide an improvement in the operation of the absorption-stripping cycle of an absorption process for the removal of acidic material from fluids containing the same.

Further objects and advantages of the present invention will become apparent to those skilled in the art from the following description and disclosure.

According to this invention an aqueous amine solution which tends to become corrosive toward metallic surfaces, such as iron, is prevented from corroding such metallic surfaces by incorporating in said solution a minor amount of all or a portion of a plant selected from the genus Allium of the lily family (Liliaceae). Allium is a large genus of bulbous herbs of the lily family distinguished by the characteristic odor, sheathing, mostly basal leaves, and umbellate white, yellow, or red flowers. The more common species include the onion (Allium cepa), garlic (Allium sativum), chive (Allium schoenoprasum), leek (Allium porrum) and shallot (Allium ascolonicum.) I have discovered, much to my surprise, that corrosion to metallic surfaces by aqueous amine solutions used to remove acidic substances from hydrocarbon fluids, such as aqueous monoethanolamine, which become corrosive when oxidized, can be inhibited by adding to said solution a minor amount usually between 0.01 and 10, preferably between 0.2 and 5, weight per cent of an extract, pulp or fibres of a vegetable preferably selected from the group consisting of the onion, garlic, chive, leek and shallot. I do not know which particular component, or which combination, of the many components present in an onion and its close botanical relatives accomplishes the result which I have set forth, and so, of course, cannot describe the reaction mechanism by which it takes place. It should be noted, however, that the prevention of corrosion to metallic surfaces in various systems in a general way may be likened to the action of a catalyst, that is, there seems to be little basis for predicting that a particular substance will work in a given system, and, this seems especially true when considering a system wherein an aqueous amine solution is employed as absorption medium for removing acidic substances from a fluid containing the same. Thus, in the present case it certainly comes as a surprise that the lowly onion can be used as a corrosion inhibitor.

I consider as a preferred aspect of my invention the incorporation of an extract, pulp or fibres of a vegetable plant of the genus Allium into a system comprised of water, a water soluble amine and acidic substances, an oxidizing agent, and a corrodible metallic surface. An extract can be prepared by any of the usual methods, but preferably by pulverizing the bulb, or in some instances the entire plant, and recovering the liquid from the pulp by filtration, decantation, etc. It can also be obtained by "squeezing" or "pressing" the bulb or plant and recovering the liquid. The term "pulp" includes pulverized bulb and plant and pulp which has had the moisture removed. Fibres can be obtained by shredding the bulb of the plant and recovering same.

According to the preferred embodiment of this invention a fluid containing acidic materials is passed to an absorption zone and is contacted with a suitable absorption medium containing an amino alcohol to remove the acidic materials. When operating in the vapor phase, a gaseous stream containing acidic materials is introduced into the lower portion of an absorption column wherein it passes upward countercurrently to a down flowing liquid aqueous solution of an amino alcohol. The liquid aqueous solution is introduced and an effluent is removed from the upper portion of the absorption column. Enriched aqueous absorption medium is removed as a liquid from the lower portion of the absorption column and passes to the upper portion of a stripping or reactivation column. In the stripping column the acidic materials in the absorption medium are desorbed therefrom and are removed as a gaseous effluent from the upper portion of the stripping column. A reactivated liquid aqueous solution of the amino alcohol is withdrawn from the lower portion of the stripping column and recycled (after cooling) to the absorption column.

In the operation of an absorption process as described herein using an aqueous amino alcohol solution, such as a monoethanolamine solution or a diethanolamine solution, or an equeous solution of both, an extract, pulp or fibres as above described, preferably an extract of onion (Allium cepa) is added, usually to the aqueous solution, to inhibit its corrosiveness on metallic surfaces during the absorption process. Extract of onion is added and maintained in the aqueous solution in an amount between 0.01 and 10, preferably between 0.2 and 5, weight per cent.

The fluid to be treated in the absorption zone may be either a vapor or a liquid phase. In case the fluid is a liquid, such as a liquid hydrocarbon stream used as a polymerization feed stock, the liquid stream is passed upward through the absorption zone countercurrently to the downward flow of the liquid absorption medium by virtue of the difference in densities of the two streams.

The process for the removal of acidic material from fluids by absorption in an aqueous solution of an amino alcohol is based on a chemical phenomenon that acidic materials, such as hydrogen sulfide, carbon dioxide, react with the amine to form a chemical compound which may be dissociated by heat. For example, typical reactions between a primary amine and hydrogen sulfide are as follows:

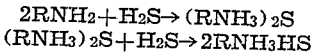

These reactions are reversible, the equilibria depending largely upon the concentration of the reactants and the temperature.

The drawing diagrammatically represents an arrangement of apparatus for carrying out the process of this invention to be described more fully hereinafter. In order that this invention may be clearly understood and its applicability realized a brief description of the process for the removal of hydrogen sulfide from a gaseous hydrocarbon stream by contact with an aqueous solution of an amino alcohol containing an extract of onion as an inhibitor will be made. A hydrocarbon stream, such as sour natural gas, containing hydrogen sulfide in an amount between about 2 to about 9000 grains per 100 cubic feet of gas (standard conditions), that is, about 65 to about 290,000 parts per million, is passed to absorber 6 through line 4. The hydrocarbon stream passes upward through baffles, trays, or packing in absorber 6 countercurrently to a down flowing liquid amine solution. A gaseous hydrocarbon stream substantially free from hydrogen sulfide and any other acidic material is removed from absorber 6 through line 7. The hydrogen sulfide of the effluent hydrocarbon stream is below about one and one half grains and may be as low as about 0.02 grain per 100 cubic feet of gas, that is, about 0.65 part per million. The liquid aqueous amine solution is introduced into the upper portion of absorber 6 through line 8. Typical aqueous amine solutions may comprise about 10 to about 40 per cent monoethanolamine and, in some instances, also about 25 to about 40 per cent diethylene glycol. The enriched amine solution is removed from absorber 6 and is passed to heat exchanger 11 through line 9 and thence to stripper 13 through line 12.

Suitable temperatures and pressures are maintained in absorber 6 to ensure removal of substantially all of the hydrogen sulfide from the hydrocarbon stream by absorption. The pressure within absorber 6 corresponds generally to the pressure available in the incoming hydrocarbon stream. The temperature is maintained in absorber 6 above the dewpoint of the hydrocarbon stream being treated. In general, the temperature is maintained between about 60 to about 175° F. at an existing pressure between atmospheric and 800 pounds per square inch gage.

Hydrogen sulfide and other acidic materials dissolved in the enriched amine solution are desorbed in stripper 13 by heating. Heat is supplied to stripper 13 by passing steam through heating element 24 located at the bottom of stripper 13. Hydrogen sulfide and water vapor pass overhead from stripper 13 through line 16 and thence through condenser 17 to accumulator 18. Water vapor is condensed in condenser 17 and the resulting condensate is collected in the lower portion of accumulator 18. Hydrogen sulfide and other gases are vented from the system through line 19. A portion or all of the condensate in accumulator 18 is passed through line 21 to the upper portion of stripper 13 as a liquid reflux therefor and as make-up water for the system. Liquid amine solution, substantially free from hydrogen sulfide, accumulates in the lower portion of stripper 13. The reactivated amine solution is withdrawn from stripper 13 through line 32 and may be recycled directly to absorber 6 through line 33, heat exchanger 11, line 34, cooler 36, line 37 and line 8.

Generally, a temperature between about 200 and about 300° F. and a pressure between about atmospheric and about 30 pounds per square inch gage are maintained on stripper 13. Stripper 13 contains conventional bubble trays, baffles or packing to ensure effective removal of acidic material from the amine absorption liquid.

Make-up absorption liquid or make-up water may be added to the system through line 8 when necessary. Unrecycled condensate is discharged through line 22.

The corrosion inhibiting compound, in particular extract of onion or "onion juice," is generally added to the system through line 35 in the appropriate quantities either intermittently or continuously. As most every housewife knows the onion has a characteristic pungent odor and lachrymatory effect which is believed to be caused by a trace of allyl sulfide. As previously stated, it is not known which component, or which combination of components, in the onion and its close botanical relatives makes it work as a corrosion inhibitor. The composition of onion and garlic has been reported anonymously in 42 Kiserletügyi Közlemenyek 62–6 (1939) (abstracted in 33 Chemical Abstracts 7419). 89 samples of onion and 30 samples of garlic were investigated and the onion was found to contain 84.33–90.82 per cent water, 6.23–11.67 per cent total sugar, 1.14–2.00 per cent protein, 0.38–0.70 per cent ash and 0.027–0.050 per cent allyl sulfide; ash alkalinity was 2.40–3.91; pH was 5.51–7.00. The garlic contained 40.30–66.50 per cent water, 18.90–32.56 per cent total sugar, 3.00–10.11 per cent protein, 0.87–2.83 per cent ash and 0.086–0.220 per cent allyl sulfide; ash alkalinity was 1.24–8.30; pH was 5.80–6.63. From the foregoing analysis there is no apparent reason for predicting that the onion and its close botanical relatives would operate as a corrosion inhibitor in the presence of an aqueous amine solution which tends to become corrosive to metallic surfaces.

The following example is presented as illustrative of the applicability of extract and pulp of onion as corrosion inhibitor in the presence of aqueous monoethanolamine and should not be considered to unduly limit the invention.

EXAMPLE

The data for this example were obtained by employing monoethanolamine solution which was to be, and which had been, used for the removal of carbon dioxide from an ammonia synthesis gas stream containing same.

Raw onions were pulverized and a liquid extract obtained from the pulverized pulp. Liquid extract was added in varying amounts to 25 ml. of filtered plant lean [1] monoethanolamine solution and to 25 ml. of filtered foul [2] monoethanolamine solution in 125 ml. Erlenmeyer flasks. Blank runs, that is, without the inhibitor, were also included. Fifteen grams of freshly cleaned carbon steel cut stove bolts were added to each solution. The flasks containing each solution was connected to reflux water-jacketed condensers and lowered into an oil bath maintained at approximately 300° F. and refluxed for fifteen hours. At the end of that period the flasks were removed from the bath and condensers and immediately stoppered. A blanket of helium was placed over the liquid in each flask and the flasks and contents cooled in a water-ice bath. The iron was removed from each flask and the ferric iron in the liquid determined. The following data were obtained.

*Parts per million ferric iron*

| Volume Onion Extract added | Lean MEA without onion extract | Lean MEA with onion extract | Foul MEA without onion extract | Foul MEA with onion extract |
| --- | --- | --- | --- | --- |
| ½₂ ml | 2,920 | 1,840 | 5,160 | 4,300 |
| ½₂ ml | 3,100 | 1,900 | 4,900 | 4,100 |
| ¼ mil | 2,000 | 620 | 4,000 | 860 |
| ¼ ml | 2,000 | 640 | 4,200 | 880 |
| ½ ml | 2,300 | 700 | 4,760 | 500 |
| ½ ml | 2,400 | 1,100 | 4,800 | 600 |
| 1 ml | 2,700 | 200 | 4,760 | 200 |
| 1 ml | 2,740 | 200 | 4,600 | 300 |
| Fragment of pulp | | | 4,980 | 1,240 |
| | | | 5,000 | 1,240 |
| Do | | | 3,100 | 1,600 |
| | | | 3,200 | 1,600 |

[1] The term "lean" is applied to the monoethanolamine solution to indicate the condition of this solvent after the carbon dioxide gases have been stripped from the solvent.
[2] The term "foul" is applied to the monoethanolamine solution to indicate the condition of this solvent after the carbon dioxide gases have been absorbed by the solvent.

For convenience and clarity, certain apparatus such as pumps, tanks, accumulators, valves etc. have not been shown in the drawing. Obviously various modifications of the present invention may be practiced without departing from the scope of the invention.

I claim:

1. A method for preventing corrosion to metallic surfaces by an aqueous amine solution which becomes corrosive thereto which comprises adding to said aqueous amine solution and maintaining therein a minor amount of at least one from the group consisting of an extract, pulp and fibres of at least one member of the genus Allium of the lily family.

2. A method for preventing corrosion to metallic surfaces by an aqueous amine solution which becomes corrosive thereto which comprises adding to said aqueous amine solution and maintaining therein between 0.01 and 10 weight per cent of one from the group consisting of an extract, pulp and fibres of a vegetable selected from the group consisting of onion, garlic, chive, leek and shallot.

3. A method according to claim 2 wherein an extract of onion is employed.

4. In a process for the removal of acidic material from a fluid mixture by contacting said mixture with an aqueous solution of water soluble organic amine in an absorptive system in which said amine becomes oxidized and thereby corrosive, the method of preventing corrosion of metallic surfaces with which said amine solution makes contact, which comprises adding to said aqueous amine solution and maintaining therein a minor amount of one from the group consisting of an extract, pulp and fibres of a member of the genus Allium of the lily family.

5. In a process for the removal of acidic material selected from the group consisting of carbon dioxide, sulfur dioxide, and hydrogen sulfide from a fluid mixture containing said acidic material by contacting said mixture with an aqueous solution of water soluble organic amine in an absorption system in which said amine becomes oxidized and thereby corrosive, the method of preventing corrosion of metallic surfaces with which such amine solution makes contact, which comprises adding to said aqueous amine solution and maintaining therein between 0.01 and 10 weight per cent of one from the group consisting of an extract, pulp and fibres of a vegetable from the group consisting of onion, garlic, chive, leek and shallot.

6. A process according to claim 5 in which said amine is monoethanolamine.

7. A process according to claim 5 in which said amine is diethanolamine.

8. A process according to claim 5 wherein an extract of onion is employed.

9. A process according to claim 5 wherein an extract of garlic is employed.

10. A process according to claim 5 wherein onion pulp is employed.

11. A process according to claim 5 wherein garlic pulp is employed.

12. In a process for the removal of acidic material including hydrogen sulfide in an amount between 65 and 290,000 parts per million from a hydrocarbon fluid mixture containing the same by passing such a fluid mixture into the lower portion of an absorption zone, passing into the upper portion of said absorption zone an aqueous solution of a water soluble amine which becomes oxidized and thereby corrosive, removing a fluid effluent substantially free from acidic material from the upper portion of said absorption zone, removing an enriched liquid amine solution containing acidic material from the lower portion of said absorption zone, passing said enriched liquid amine solution to a stripping zone, heating the lower portion of said stripping zone, removing a gaseous mixture containing free acidic material from the upper portion of said stripping zone, withdrawing a liquid aqueous amine solution substantially free from acidic material from the lower portion of said stripping zone and passing the same to said absorption zone, the method for preventing corrosion of metallic surfaces which are contacted by said aqueous amine solution, particularly the surfaces in said stripping zone, which normally become corroded during said process, which comprises incorporating in said aqueous amine solution an extract of onion and maintaining the content of said extract of onion in said aqueous solution between 0.01 and 5 weight per cent.

13. In a process for the removal of acidic material including carbon dioxide in an amount between 65 and 290,000 parts per million from a gaseous mixture containing the same by passing such a fluid mixture into the lower portion of an absorption zone, passing into the upper portion of said absorption zone an aqueous solution of a water soluble amine which becomes oxidized and thereby corrosive, removing a fluid effluent substantially free from acidic material from the upper portion of said absorption zone, removing an enriched liquid amine solution containing acidic material from the lower portion of said absorption zone, passing said enriched liquid amine solution to a stripping zone, heating the lower portion of said stripping zone, removing a gaseous mixture containing free acidic material from the upper portion of said stripping zone, withdrawing a liquid aqueous amine solution substantially free from acidic material from the lower portion of said stripping zone and passing the same to said absorption zone, the method for preventing corrosion of metallic surfaces which are contacted by said aqueous amine solution, particularly the surfaces in said stripping zone, which normally become corroded during said process, which comprises incorporating in said aqueous amine solution an extract of onion and maintaining the content of said extract of onion in said aqueous solution between 0.01 and 5 weight per cent.

14. In a process for the removal of acidic material selected from the group consisting of carbon dioxide, sulfur dioxide and hydrogen sulfide from a fluid mixture by contacting said mixture containing said acidic material with a 20 to 40 per cent aqueous solution of monoethanolamine in an absorption system in which said amine becomes oxidized and thereby corrosive, the method of preventing corrosion of metallic surfaces with which said aqueous monoethanol amine solution makes contact, which comprises adding to said aqueous monoethanol amine solution and maintaining therein between 0.01 and 5 weight per cent of an extract of onion.

15. In a process for the removal of acidic material from a hydrocarbon fluid mixture by contacting said mixture containing said acidic material with an aqueous solution of water soluble organic amine in an absorption system in which said amine becomes oxidized and thereby corrosive, the method of preventing corrosion of metallic surfaces with which said aqueous amine solution makes contact, which comprises adding to said aqueous amine solution and maintaining therein between 0.01 and 5 weight per cent of an extract of onion.

HOWARD C. ASBURY.

References Cited in the file of this patent

UNITED STATES PATENTS

| Number | Name | Date |
|---|---|---|
| 2,209,440 | Adams et al. | July 30, 1940 |
| 2,211,798 | Story et al. | Aug. 20, 1940 |
| 2,238,651 | Keenan | Apr. 15, 1941 |
| 2,474,603 | Viles et al. | June 28, 1949 |

OTHER REFERENCES

"Triethanolamine, an Absorbent for Acid Gases," Carbide and Carbon Chemicals Corporation, July 1, 1930.